US012697803B2

(12) United States Patent
Hine et al.

(10) Patent No.: US 12,697,803 B2
(45) Date of Patent: Aug. 4, 2026

(54) COMPOSITE MATERIALS

(71) Applicant: UNIVERSITY OF LEEDS, Leeds (GB)

(72) Inventors: Peter John Hine, Leeds (GB); Michael Edward Ries, Leeds (GB)

(73) Assignee: University of Leeds (GB)

( * ) Notice: Subject to any disclaimer, the term of this patent is extended or adjusted under 35 U.S.C. 154(b) by 489 days.

(21) Appl. No.: 17/260,958

(22) PCT Filed: Jul. 18, 2019

(86) PCT No.: PCT/GB2019/052005
§ 371 (c)(1),
(2) Date: Jan. 15, 2021

(87) PCT Pub. No.: WO2020/016583
PCT Pub. Date: Jan. 23, 2020

(65) Prior Publication Data
US 2021/0323282 A1 Oct. 21, 2021

(30) Foreign Application Priority Data
Jul. 19, 2018 (GB) ...................................... 1811808

(51) Int. Cl.
| | |
|---|---|
| B32B 23/10 | (2006.01) |
| B31F 1/00 | (2006.01) |
| B31F 1/36 | (2006.01) |
| B32B 5/02 | (2006.01) |
| B32B 7/12 | (2006.01) |
| B32B 23/06 | (2006.01) |
| C08L 1/02 | (2006.01) |

(52) U.S. Cl.
CPC ............ *B32B 23/10* (2013.01); *B31F 1/0077* (2013.01); *B31F 1/36* (2013.01); *B32B 5/02* (2013.01); *B32B 7/12* (2013.01); *B32B 23/06* (2013.01); *C08L 1/02* (2013.01); *B32B 2250/05* (2013.01); *B32B 2250/42* (2013.01); *B32B 2262/04* (2013.01); *B32B 2307/748* (2013.01)

(58) Field of Classification Search
CPC .. B32B 23/10; B32B 5/02; B32B 7/12; B32B 23/06; B32B 2250/05; B32B 2250/42; B32B 2262/04; B32B 2307/748; B31F 1/0077; B31F 1/36; C08L 1/02
See application file for complete search history.

(56) References Cited

U.S. PATENT DOCUMENTS

| | | | |
|---|---|---|---|
| 8,202,379 B1 | 6/2012 | DeLong et al. | |
| 9,079,324 B2 * | 7/2015 | Stone ...................... | B32B 3/266 |
| 2010/0019021 A1 * | 1/2010 | Dixon-Garrett ..... | B65D 81/343 |
| | | | 229/117.27 |
| 2010/0233468 A1 * | 9/2010 | Ioelovich .............. | D21H 19/52 |
| | | | 428/326 |
| 2014/0338242 A1 * | 11/2014 | Zhou ...................... | D21H 17/34 |
| | | | 428/479.6 |

FOREIGN PATENT DOCUMENTS

| | | | | |
|---|---|---|---|---|
| DE | 20108814 U1 | 8/2001 | | |
| GB | 1390240 A * | 4/1975 | ............. | A41D 31/02 |
| GB | 1595905 A | 8/1978 | | |
| JP | S63-203898 A | 8/1988 | | |
| JP | 2003236987 A * | 8/2003 | | |
| WO | WO 1995/24520 A1 | 9/1995 | | |
| WO | WO 2008/084139 A1 | 7/2008 | | |
| WO | WO 2013/098203 A2 | 7/2013 | | |
| WO | WO 2013/174870 A1 | 11/2013 | | |

OTHER PUBLICATIONS

Cotton Incorporated, "Cotton Morphology and Chemistry", accessed Jun. 28, 2023, online, https://www.cottoninc.com/quality-products/nonwovens/cotton-fiber-tech-guide/cotton-morphology-and-chemistry/ (Year: 2023).*
Machine translation of Furuta et al. (JP 2003236987 A) (Year: 2003).*
Reasons for Rejection of the Japanese Patent Application No. 2021-502801 dated Jul. 8, 2022, along with the English translation; 14 pages.
German Search Report of GB1811808.3 dated Nov. 20, 2018, 3 pages.
International Search Report and Written Opinion of the International Searching Authority of PCT/GB2019/052005 mailed Jan. 23, 2020, 12 pages.
Huber, Tim et al., "All-Cellulose Composite Laminates", Composites Part A: Applied Science and Manufacturing, vol. 43, No. 10, Oct. 2012, pp. 1738-1745.

* cited by examiner

*Primary Examiner* — Callie E Shosho
*Assistant Examiner* — Bethany M Miller
(74) *Attorney, Agent, or Firm* — Farhang Amini; Shackelford, McKinley & Norton, LLP

(57) ABSTRACT

The invention relates to a composite material comprising cellulose. The composite material comprises a first cellulose-based material, which may be a textile or fabric, and a second cellulose-based material, which may be a film or cellulose based material or powdered cellulose-based material. The second cellulose-based material may be a sheet material comprising cellulose, such as a paper or a regenerated cellulose film. In embodiments the material is a so called "all cellulose composite" where both of the materials that are brought together are different forms of material comprising or being cellulose. For example, the different materials originate from cellulose-based feedstocks. The invention also relates to a process for preparing the composite materials of the invention utilising ionic liquids.

6 Claims, 9 Drawing Sheets

COMPOSITE MATERIALS

CROSS-REFERENCE TO RELATED APPLICATIONS

This application is a national-stage filing under 37 USC 371 (c) of International Application No. PCT/GB2019/052005, filed Jul. 18, 2019, which claims priority to, and the benefit of, Great Britain Patent Application GB 1811808.3, filed Jul. 19, 2018, the entire contents of each patent application are herein incorporated by reference in their entirety for all purposes.

This invention relates to a material comprising cellulose. The material may be a composite material. In embodiments the material is a so called "all cellulose composite" where both of the materials that are brought together are different forms of material comprising or being cellulose. For example, the different materials originate from cellulose-based feedstocks. A first material of the composite may be a textile comprising cellulose and a second material of the composite may be a sheet material comprising cellulose. The invention also relates to a process for preparing the composite materials of the invention. The present invention also contemplates uses of the composite materials.

BACKGROUND

Composite materials are materials that are made from two different constituent materials. Ordinarily the two constituent materials have different material properties and the composite material may then share the properties from both materials or have different or improved properties.

There are examples of composite materials being used in a range of fields, such as construction, automotive, furniture, and clothing amongst others. Materials that can be incorporated into composite materials are wide ranging. For example, concrete is a composite material comprising an aggregate and cement. Similarly, plywood is a composite material with sandwiched layers of wood veneers glued together, as is chipboard.

Cellulose composite materials are known within the art. WO 2012/006720 discloses the formation of a composite cellulose material. The composite material is formed of a cellulose gel comprising a cellulose matrix and cellulose nanowhiskers. The cellulose gel disclosed in WO 2012/006720 is used as a scaffold for tissue regeneration.

All cellulose composites, where the components of the composite are drawn from cellulose derived feedstocks, have been investigated for a number of years. However, all cellulose composites suffer from the fact that cellulose-based materials cannot easily be solution or melt processed, as discussed in Zhao et al (Cellulose (2009) 16:217-226, Novel all-cellulose ecocomposites prepared in ionic liquids). Zhao et al proposes the use of ionic liquids as a medium for solvent processing all cellulose composites. Zhao et al uses rice husks with dissolved filter paper acting as the cellulose matrix.

Zhao et al requires that the filter paper is completely dissolved in ionic liquid and then mixed with rice husks that have been pre-treated with ionic liquid. The cellulose matrix is therefore a liquid medium whilst the rice husks are distributed within the liquid matrix, acting as reinforcement to the otherwise weaker cellulose matrix. As such, a great deal of ionic liquid is required to produce the all cellulose composites disclosed in Zhao. It is an aim of certain embodiments of the present invention to reduce the use of ionic liquid in the process for producing all cellulose composites.

In addition, the composite disclosed in Zhao et al must be cast in order to provide an article. Any article formed by the process of Zhao et al must be transformed from a liquid to a solid by the casting process. Without a casting step the cellulose composite described in Zhao et al would have no solid, physical structure. Casting a liquid solution comprising cellulose to produce an article may reduce the potential applications for the article. For example, casting a three dimensional article would not be appropriate. Therefore, an aim of certain embodiments of the present invention is to avoid the need for casting. Another related aim of certain embodiments of the present invention is to avoid the use of conversion from a liquid to a solid form. In particular, an aim of certain embodiments of the present invention is to provide an article whose physical structure, shape or configuration can be defined by the components of the composite material, for example as opposed to the physical structure being defined by setting a liquid in a cast or mould. In addition an aim of certain embodiments of the present invention is to provide three dimensional articles.

Cast cellulose composites such as that disclosed in Zhao et al have less desirable physical properties due to the absence of an internal supporting structure. Beneficial physical properties can be obtained by utilising a component of the composite that has a network of reinforcing fibres. Such a network can be found in cellulose-based woven textiles.

Accordingly, Huber et al (Composites: Part A 43 (2012) 1738-1745; All-cellulose composite laminates) has demonstrated that linen and rayon textiles can be layered and exposed to ionic liquids to provide an all cellulose article. This methodology does not directly introduce a matrix material but relies on partial dissolution of the cellulose surface followed by regeneration of the cellulose to form a matrix phase. However, the mechanical properties of composite materials produced by this method can be lower than desired, and in particular the interlayer peel strength. As such, it is an aim of certain embodiments of the present invention to provide a cellulose-based article with improved mechanical properties. The improved mechanical properties may be the modulus or tensile stress or tensile strength or the interlayer peel strength.

Cast composite materials, such as that disclosed by Zhao et al, benefit from the absence of multiple layers. Although the multiple layers of Huber et al provide a positive effect on tensile strength and tensile modulus when compared to cast cellulose composites, the presence of multiple layers within an article can give rise to delamination. Ease of delamination of the multiple layers is measured through the peel strength of a laminar article. A low peel strength indicates a higher propensity to delaminate. Accordingly, it is an aim of certain embodiments of the present invention to provide an improved peel strength.

The peel strength of a layered composite material is particularly important where an article formed from the composite material is to be moulded. Moulded articles are shaped. In shaping a layered composite, the material will be placed under strain at any point of deformation, such as a corner. Tension on the layers at a point of deformation in the moulded structure can lead to delamination. Delamination at a point of deformation of a moulded article will substantially affect the look and the suitability of a moulded article for its intended purpose. As such, an aim of certain embodiments of the present invention is to provide a composite material that is suitable for moulding that may additionally avoid delamination or damage at a point of deformation.

Peel strength can also be important where the final structure is subjected to repeated low level deformation or stress. If the peel strength is low, then this repeated deformation can lead to delamination between the layers and degrade mechanical performance, particularly the modulus. The ability to survive such deformation, often termed damage tolerance, is greatly enhanced by improving the inter-layer peel strength. Accordingly, an aim of certain embodiments of the present invention is to improve the damage tolerance of cellulose-based composite materials compared to cellulose composite materials not of the invention.

BRIEF SUMMARY OF THE DISCLOSURE

In accordance with the present invention there is provided a composite material, wherein the composite material is formed of a first cellulose-based material and a second cellulose-based material, wherein the first cellulose-based material and the second cellulose material are alternately layered with one another such that there are at least two layers of either the first or second cellulose-based material and at least one layer of the other cellulose-based material.

Optionally, wherein the first cellulose-based material is a textile (optionally a woven textile that is comprised of continuous cellulose fibres or a non-woven textile) and the second cellulose-based material is a cellulose-based sheet, film or powder. The second cellulose-based material is optionally derived from processed or regenerated cellulose (for example paper, regenerated cellulose film or similar). The second cellulose based material or the cellulose-based sheet material may also be referred to as an interleaf layer.

The first cellulose-based material may be comprised of virgin plant based fibres (for example woven flax fibres (linen) or woven cotton (denim)), whereas the second cellulose based material is usually a regenerated cellulose source (for instance chopped wood fibres (paper) or a completely regenerated cellulose film (e.g. cellophane)).

The second cellulose-based material or the cellulose-based sheet material may be any material that comprises cellulose and that is formed into a sheet. Preferably the sheet material is predominantly cellulose. The cellulose-based sheet material may comprise cellulose, hemicellulose and lignin. Preferably, the cellulose-based sheet material is formed of cellulose. However, if the cellulose-based sheet material is formed of cellulose it is possible that there may be small amounts of non-cellulose impurities within the sheet material.

Any "material" considered within the scope of the present invention may be considered to be a cellulose-based material. In any context where a material or other component of the invention is indicated as being "cellulose-based" it is intended to refer to a component or material that is predominantly but not exclusively cellulose or to a component or material that is exclusively cellulose. A "cellulose-based" material for example may be a component that comprises cellulose. Furthermore, any cellulose based material may optionally be naturally-occurring-cellulose based material where the cellulose within the material is a type of cellulose that is naturally occurring. The material itself may be naturally occurring but that is not a requirement. For example, the cellulose-based material may be a form of naturally occurring cellulose that is processed into a fibre then a textile or processed into a powder or a film. However, the chemical nature of the cellulose within the cellulose based material has not been modified. Accordingly, the cellulose of the cellulose-based material is optionally not a chemically modified cellulose. As indicated, the invention contemplates that the cellulose of the cellulose-based materials is optionally not a chemically modified cellulose;

however, the cellulose may have undergone chemical modification when the cellulose-based material was being manufactured.

In an embodiment the composite material of the invention does not comprise plasticised materials. In particular, the composite material or any component contained within the cellulose material does not comprise a plasticiser.

In an embodiment all of the components of the composite material are naturally occurring. The components may have been physically processed into a material but without chemical modification. Furthermore, the components of the composite material have previously been chemically modified during a processing step or processing procedure; however, the cellulose has then been reverted or regenerated into the naturally occurring form of cellulose.

In embodiments the first cellulose-based material is a textile comprising cellulose), wherein the cellulose is not chemically modified (optionally a woven textile that is comprised of continuous cellulose fibres or a non-woven textile) and the second cellulose-based material is a cellulose-based sheet, film or powder comprising cellulose, which is not chemically modified. The second cellulose-based material is optionally derived from processed or regenerated cellulose (for example paper, regenerated cellulose film or similar), wherein the cellulose is not chemically modified.

In certain embodiments the second cellulose-based material or the cellulose-based sheet material is an interlayer disposed between the layers of cellulose-based textile.

The composite material of the present invention, like all composite materials, combines two different materials. In this case the two different materials are a cellulose-based sheet material and a cellulose-based textile. Although the two different materials that form the composite of the present invention fulfil the definitions of a sheet material and a textile before forming the composite material the two different materials may not conform to that definition when in the composite material. For example, the sheet material within the composite material may no longer be a single sheet because it will be combined, within the composite, with the cellulose-based textile layers, optionally two cellulose-based textile layers (for example one on either side of the cellulose-based sheet).

FIGS. 2 and 3 show an images of a cross section of exemplary composites of the invention. The discrete layers are evident in the image with the weave of the cellulose-based textile being visible and the cellulose based sheet material also being visible.

The layers of the composite material may be attached to each other. The term "the layers" refers collectively to all or some of the layers of the first or second cellulose-based material. Specifically, where a layer of one of the first or second cellulose-based material is adjacent to the other cellulose-based material, the two cellulose based materials (the first and second cellulose-based materials) may be attached to each other. The attachment between layers may be by virtue of Type II and/or amorphous cellulose. Facilitating the attachment between the layers, the second cellulose-based material may be at least partially diffused into the first cellulose-based material, thus providing an alloy region, i.e. a region comprising material of both the first cellulose-based material and the second cellulose-based material. The alloy region may comprise Type II and amorphous cellulose.

Accordingly, the composite material of the present invention may comprise a first cellulose-based material, a second cellulose-based material, and an alloy region. The alloy region may be considered to be a region comprising material of both the first cellulose-based material and the second cellulose-based material.

For example, in the simplest form of the composite material of the invention there are two layers of cellulose-based textile and a single layer of cellulose-based sheet material interleaved between the two cellulose-based textile layers. The single cellulose-based sheet material will be attached to both cellulose-based textile layers. Each of the two cellulose-based textile layers will only be attached to the single cellulose-based sheet material. As such, the two cellulose-based textile layers will have one side free of attachment. Accordingly, in embodiments the composite has a top surface. In certain embodiments the composite has a bottom surface. In certain embodiments the composite has both a top surface and a bottom surface.

The top surface of the composite material may be either the cellulose-based textile or the cellulose-based sheet material. The bottom face of the composite material may be either the cellulose-based textile or the cellulose-based sheet material.

In certain embodiments the top surface of the composite material is the cellulose-based textile and the bottom surface of the composite material is the cellulose-based textile. In certain embodiments the top surface of the composite material is the cellulose-based textile and the bottom surface of the composite material is the cellulose-based sheet material. In certain embodiments the top surface of the composite material is the cellulose-based sheet material and the bottom surface of the composite material is the cellulose-based textile. In certain embodiments the top surface of the composite material is the cellulose-based sheet material and the bottom surface of the composite material is the cellulose-based sheet material.

The present invention contemplates more extensive composite materials with a greater number of layers than three. For example, counting all of the layers of the first and second cellulose-based materials the composite material may have from 3 to 100 layers. In certain embodiments the composite material may have from 3 to 50 layers, 3 to 40 layers, 3 to 25 layers, 3 to 10 layers or 3 to 5 layers. In a preferred embodiment the composite material has from 3 to 20 layers. The layers within embodiments of the invention are alternating layers of first and second cellulose-based material.

In embodiments of the invention the composite material comprises cellulose, wherein the cellulose comprises:
from about 10% to about 90% cellulose type 1;
from about 10% to about 50% amorphous cellulose; and
from about 2% to about 45% regenerated cellulose and/or cellulose II.

In embodiments of the invention the composite material comprises cellulose, wherein the cellulose comprises:
from about 40% to about 60% cellulose type 1;
from about 25% to about 38% amorphous cellulose; and
from about 2% to about 45% regenerated cellulose and/or cellulose II.

The composite material of the present material can be considered as being formed of a reinforcement member, a matrix material and a film material. Relative to earlier definitions of the invention the reinforcement member may be the first cellulose-based material, the film may be the second cellulose-based material and the matrix may be cellulose derived from either the first or second cellulose-based material. In certain embodiments the reinforcement material is present as 40% to 70% of the composite material;

the matrix material is present as 10% to 30% of the composite material and the film material is present as 2% to 45% of the composite material.

In an aspect of the present invention there is provided a composite material comprising a cellulose-based reinforcement member, a cellulose matrix material and a cellulose-based film material. The reinforcement material may be present as 40% to 70% of the composite material; the matrix material may be present as 10% to 30% of the composite material and the film material may be present as 2% to 45% of the composite material.

The reinforcement material may provide an internal structure to the composite material. This structure may provide strength to the composite material. The matrix material may be interspersed within the reinforcement material. As such, the reinforcement material may be considered to be a framework throughout which the matrix material extends. The film material may be an interstitial layer in-between layers of the reinforcement material. Thus, the composite material may be formed of alternating layers of reinforcement material and film material with matrix material dispersed throughout the composite material.

The reinforcement material may be substantially cellulose I, the film material may be substantially cellulose I, cellulose II or amorphous cellulose, and the matrix material may be substantially cellulose II.

In certain embodiments of the invention the composite material has a peel strength of at least 50 N/m. Optionally, the peel strength may be at least 200 N/m.

In certain embodiments of the invention the composite material has a peel strength of from 50 to 2000 N/m. It is preferred to have a higher peel strength than composite materials of the prior art. A higher peel strength demonstrates preferable properties for the cellulose composite material. Accordingly, the peel strength may be from 50 to 750 N/m, or from 200 N/m to 500 N/m. The peel strength of a composite material may be from 150 N/m to 300 N/m, from 200 N/m to 300 N/m, from 300 N/m to 500 N/m, from 400 N/m to 500 N/m, from 200 N/m to 400 N/m, or from 100 N/m to 450 N/m. The peel strength of the composite materials of the present invention may be determined by following the guidelines of ASTM D1876, for example by testing a sample with a width of 10 mm and a length of 80 mm and a testing speed of 80 mm/min. The measured peel force was averaged between 20 mm and 70 mm on the sample, and the results are presented in terms of the average force for a 1 metre width (N/m).

The first cellulose-based material or the cellulose-based textile may be a textile comprising or formed of natural fibres or of manmade fibres.

The first cellulose-based material or the cellulose-based textile may be or comprise a cellulose-based fibre, as an example selected from: cotton, flax, jute, hemp, ramie, sisal, bamboo, rayon, Tencel, Ioncell, and lyocell. The first cellulose-based material or the cellulose-based textile may be or comprise a fibre selected from: cotton, flax, jute, hemp, ramie, sisal, bamboo, rayon, Tencel, Ioncell, and lyocell.

The first cellulose-based material or the cellulose-based textile may be or comprise a natural fibre selected from: cotton, flax, jute, hemp, ramie, sisal, and bamboo.

The first cellulose-based material or the cellulose-based textile may be or comprise a manmade fibre selected from: rayon, Tencel, Ioncell, and lyocell.

Rayon is a manufactured fibre made from regenerated cellulose fiber. The cellulose is derived from wood pulp. The rayon fibre is nearly pure cellulose, as such rayon fibre may have greater than 90% cellulose, optionally greater than 95% cellulose. Tencel is a cellulose fibre sourced from wood and may be classified as a modal rayon fibre. Modal rayon fibre is a type of reconstituted cellulose fibre produced by spinning. Ioncell is a recycled cellulose based fibre produced from recycled materials such as clothing, textiles, wood pulp, newspaper or cardboard. Generally, the manmade fibres are cellulose-based fibres. As such, the manmade fibres are predominantly cellulose.

Preferably the first cellulose-based material may be flax.

The first cellulose-based material or the cellulose-based textile may be or comprise a manmade or naturally occurring fibre comprising greater than 60% cellulose, greater than 70% cellulose, or greater than 80% cellulose. For example, the first cellulose-based material or the cellulose-based textile may be or comprise a manmade or naturally occurring fibre comprising 90% cellulose, optionally greater than 95% cellulose. Equally, the term "cellulose-based" refers to fibres or textiles which have a cellulose content as defined in this paragraph.

The second cellulose-based material or the cellulose-based sheet material may be selected from any regenerated cellulosic source. For example, the regenerated cellulose source may be a film, sheet or powder, such as cellulose powder, wood powder, filter paper or a regenerated cellulose film (e.g. cellophane). Optionally, the second cellulose-based material, the cellulose-based sheet material, or the regenerated cellulosic source may be selected from a film or sheet material, optionally filter paper or a regenerated cellulose film (e.g. cellophane).

Cellophane is a material made of regenerated cellulose. Raw materials such as wood, cotton or hemp are processed into viscose which is then extruded into a sheet to produce cellophane as a thin, transparent material.

In certain embodiments the second cellulose-based material or the cellulose-based sheet material comprises greater than 90% cellulose, optionally greater than 95% cellulose.

In an aspect of the present invention there is provided a cellulose-based composite material with a peel strength of from 50 N/m to 750 N/m. The composite material may have any of the features disclosed elsewhere herein in relation to a composite material. In embodiments the composite material comprises cellulose based fibres. The cellulose-based fibres may form a structure. The cellulose-based fibres may form a lattice. In certain embodiments the cellulose-based fibres may form a weave or knit. The cellulose-based fibres may form or be derived from a textile or a non-woven structure. Accordingly, in certain embodiments the cellulose composite comprises a cellulose-based textile.

In certain embodiments the cellulose-based fibres are dispersed within a matrix comprising cellulose. In certain embodiments the cellulose-based fibres are present as a lattice that is dispersed within a matrix comprising cellulose.

Accordingly, in certain embodiments the composite material has a peel strength of from 50 N/m to 750 N/m (optionally from 200 N/m to 500 N/m) wherein the composite material comprises a lattice of cellulose fibres dispersed within a matrix comprising cellulose.

The cellulose-based fibres may be reconstituted cellulose.

The composite material of the present invention may comprise different types of cellulose. Three types of cellulose can be measured by wide angle X-ray measurements (WAXS): cellulose type 1; amorphous cellulose and regenerated cellulose. The WAXS measurements were carried out using a Huber goniometer employing Copper $K_\alpha$ radiation using an accelerating Voltage of 40 kV and a current of 30 mA. $2\theta$ scans were carried out between values of 5 and 30° C. at angle increments of 0.2° and a counting time of 120 s at each position. A background scan was carried out using the same conditions, but without the sample in position, to subtract any x-rays entering the detector by the air scattering etc. After data collection, the resulting $2\theta$ scans are examined to assess what characteristic peaks are present (cellulose I, cellulose II and the amorphous phase) and then the data is fitted with these combinations of peaks (using Excel solver) to establish what phases are present and in what fraction, as different cellulose-based materials have a different profile of each of these components. Favourable properties can be obtained with a combination of the different types of cellulose. For example, cellulose type 1 can provide impact strength and rigidity. Amorphous and regenerated cellulose can provide improved peel strength. Balancing the amount of the types of cellulose can lead to a surprising combination of beneficial properties.

By way of a comparative example the cellulose in pure linen cloth consists essentially of about 78% cellulose type 1 and about 22% amorphous cellulose.

The composite material of the present invention comprises cellulose. The cellulose in the composite material may be from about 40% to about 60% cellulose type 1, from about 25% to about 38% amorphous cellulose, and from about 2% to about 25% regenerated cellulose.

The cellulose in the composite material may be from about 44% to about 60% cellulose type 1, from about 30% to about 36% amorphous cellulose, and from about 4% to about 20% regenerated cellulose.

The composite material may comprise other incidental impurities. The composite material may also comprise other materials such as hemicellulose, lignin and potentially water, in addition to other trace materials. These other materials may be derived from the raw materials used for producing cellulose-based materials or derived from the process for producing the cellulose-based materials.

In an aspect of the invention there is provided a composite material comprising cellulose, wherein the cellulose comprises:

from about 40% to about 60% cellulose type 1;
from about 25% to about 38% amorphous cellulose; and
from about 2% to about 25% regenerated cellulose.

In embodiments the composite material is a cellulose-based composite material.

In embodiments there is provided a composite material comprising:

from about 40% to about 60% cellulose type 1;
from about 25% to about 38% amorphous cellulose; and
from about 2% to about 25% regenerated cellulose;
as well as incidental impurities.

In an aspect of the present invention there is provided a process for the preparation of a composite material, wherein the process comprises:

a) providing a layered article comprising at least three layers, wherein the at least three layers are alternating layers of a first cellulose-based material layer and a second cellulose-based material layer;

b) applying a solvent to the layered article;

c) regenerating the layered article to form a composite material.

The process optionally comprises the step of drying the layered article or drying the composite material. Drying can be completed by any method known to the person skilled in the art. For example, the layered article or composite material may be dried in an oven. The step of drying may be carried out in a hot press.

Drying may optionally be carried out at a pressure of between 0.1 MPa and 10 MPa. The drying step may be carried out at a pressure between 1 MPa and 5 MPa. Preferably, the drying step is conducted at 2 MPa.

In embodiments of the present invention drying may be carried out at a temperature above ambient temperature. Ambient temperature can be considered to generally be around 20° C. The drying step may be carried out at a temperature above 50° C. or above 80° C. or above 90° C. The upper limit of the drying temperature will be the temperature before which the composite material is negatively affected by the heat during the drying. This temperature will be evident to the skilled person in conducting the drying step. However, the upper limit of the temperature for the drying step may be 200° C. or 150° C. Preferably the drying step is carried out at 125° C. Preferably the drying step is carried out at a pressure of 2.5 MPa. In certain embodiments the drying step may be carried out at 125° C. and at 2.5 MPa. In certain embodiments the drying step may be carried out at 125° C. and at 2 MPa.

The layered article may be provided by preparing a stack of at least two first cellulose-based material layers and at least one second cellulose-based material layer, wherein the at least two first cellulose-based material layers and the at least one second cellulose-based material layer are alternatingly stacked on top of each other. In this way a first cellulose-based material layer is not adjacent to another layer of first cellulose-based material layer. Equally, a second cellulose-based material layer is not adjacent to another second cellulose-based material layer.

The second cellulose-based material layer can also be referred to as an interleaf layer. This is because the second cellulose-based material layer/interleaf layer sits in between layers of the first cellulose-based material. Accordingly, in an embodiment of the present invention the process for the preparation of a composite material comprises:

a) providing a layered article comprising at least two layers of a first cellulose-based material and at least one interleaf layer disposed in between each of the first cellulose-based material layers;

b) applying a solvent to the layered article; and c) regenerating the layered article to form a composite material.

The layered article is at least three layers. Therefore, it is possible that the layered article is at least 5 layers, at least 7 layers or at least 9 layers. Preferably the layered article consists of between 3 and 21 layers. It is possible that the layered article is made up of an odd or even number of layers. Preferably, the layered article is made up of an odd number of layers. This definition of the number of layers applies equally to the composite material of the invention.

The layered article provided in step a) can be considered to be a stack of alternating layers of the first cellulose material and second cellulose material. The stack and therefore the layered article has a top layer and bottom layer.

Having an odd number of layers allows for the top and bottom layers of the layered article to be the same material. The top and bottom layers may both be the first cellulose-based material. Alternatively, the top and bottom layers may be the second cellulose-based material. Preferably, the top and bottom layers of the layered article are a cellulose-based textile.

Where the top and bottom layers are the same, the material forming the top and bottom layers will have one more layer than the other layer forming material.

The solvent may be any solvent capable of dissolving cellulose. The solvent may be an aqueous solvent, an organic solvent or an ionic solvent. The solvent may be a single solvent or a combination of two or more solvents. Preferably the solvent is an ionic solvent.

The ionic solvent may be selected from: imidazolium salts, pyridinium salts and ammonium salts. The imidazolium salts may be selected from: 1-ethyl-3-methylimidazolium chloride, 1-ethyl-3-methylimidazolium formate, 1-ethyl-3-methylimidazolium acetate, 1-butyl-3-methylimidazolium chloride, 1-butyl-3-methylimidazolium formate, 1-butyl-3-methylimidazolium dicyanoamide, 1-allyl-3-methylimidazolium chloride, and 1-hexyl-3-methylimidazolium chloride. The pyridinium salts may be 1-butyl-3-methylpyridinium-chloride or N-ethylpyridinium chloride. The ammonium slat may be benzyldimethyl(tetradecyl)-ammonium chloride.

The organic solvent may be selected from: N-Methylmorpholine N-oxide (NMMO); dimethyl sulfoxide (DMSO); dimethylformamide (DMF); and N,N-dimethylacetamide.

The aqueous solvent may be selected from: aqueous solution of NaOH; aqueous solution of NaOH-urea; poly (ethylene glycol) (PEG); poly(ethylene glycol) (PEG) and NaOH, aqueous zinc chloride; inorganic molten salt hydrates; ammonia/ammonium thiocyanate (NH3/NH4SCN); and ethylene diamine (EDA)/KSCN.

In certain embodiments the solvent is selected from: N-Methylmorpholine N-oxide (NMMO); dimethyl sulfoxide (DMSO); dimethylformamide (DMF); N,N-dimethylacetamide; N,N-dimethylacetamide-lithium chloride; aqueous solution of NaOH; aqueous solution of NaOH-urea; poly (ethylene glycol) (PEG); poly(ethylene glycol) (PEG) and NaOH, aqueous zinc chloride; inorganic molten salt hydrates; ammonia/ammonium thiocyanate (NH3/NH4SCN); ethylene diamine (EDA)/KSCN; 1-ethyl-3-methylimidazolium chloride, 1-ethyl-3-methylimidazolium formate, 1-ethyl-3-methylimidazolium acetate, 1-butyl-3-methylimidazolium chloride, 1-butyl-3-methylimidazolium formate, 1-butyl-3-methylimidazolium dicyanoamide, 1-allyl-3-methylimidazolium chloride, and 1-hexyl-3-methylimidazolium chloride.

Preferably, the solvent is 1-Ethyl-3-methylimidazolium acetate (EMIMAc).

The solvent may be applied to the layered article before the layered article is formed or after it is formed. In embodiments of the process the step of applying the solvent to the layered article comprises applying solvent to each layer of the layered article prior to arranging the layers into a stack to form the layered article. Alternatively, the solvent may be applied to the layered article after forming the layered article. The solvent may be applied to the layered article or the layers forming the layered article by brushing, pouring, spraying or bathing. Where the solvent is applied to the layers before forming the stack, solvent may be applied to every layer, or the solvent may be applied to only the first cellulose-based material, or the solvent may be applied to only the second cellulose-based layer. Applying a solvent to the layered article may result in diffusing at least in part one of the layers into an adjacent layer to form an alloy region, i.e. a region comprising material of both the one layer and the adjacent layer.

The solvent may be applied to the layered article in any amount. However, it has surprisingly been found that the amount of solvent applied to the layered article has an effect on the properties of the composite material. The solvent may be applied to the layered article in a specific weight ratio based on the weight of cellulosic material and based on the weight of solvent, optionally as defined below, or the cellulosic material may be completely immersed in the solvent, optionally before or after formation of the layered article.

The solvent may be applied to the layered article in a weight ratio of cellulosic material:solvent of from 1:0.5 to 1:10. The cellulosic material is the combination of the first and second cellulose-based materials in the layered article. Therefore, the weight ratio of cellulosic material to solvent is a ratio of the total weight of both the first and second cellulose-based materials in the layered article relative to the weight of solvent in total applied to the layered article. Preferably, the cellulosic material:solvent ratio is from 1:1 to 1:5 or 1:1.5 to 1:5. The cellulosic material:solvent ratio may be 1:2.5.

The step c) comprises the process of regenerating cellulose within the layered article. The process of regenerating cellulose may be carried out by applying water to the layered article. The layered article may be washed with water or placed in a water bath. Step c) may optionally comprise a further step of washing the composite material. However, in preferred embodiments thee process does not comprise an additional washing step following regenerating the layered article.

In embodiments the process further comprises the step of exposing the layered article to a pressure of up to 100 MPa. Accordingly, the process of the invention may comprise the steps of:

a) providing a layered article comprising at least two layers of a first cellulose-based material and at least one interleaf layer disposed in between each of the first cellulose-based material layers;

b1) applying a solvent to the layered article;

b2) exposing the layered article to a pressure of up to about 100 MPa; and c) regenerating the layered article to form a composite material.

The layered article may be exposed to a pressure of from about 0.01 MPa to about 100 MPa, optionally from about 0.1 MPa (about atmospheric pressure) to about 100 MPa. Alternatively, the layered article may be exposed to a pressure of from about 0.5 MPa to about 50 MPa, from about 0.5 MPa to about 20 MPa, from about 0.5 MPa to about 10 MPa, from about 1 MPa to about 50 MPa, from about 1 MPa to about 10 MPa, or from about 1 MPa to about 5 MPa. The layered article may be exposed to a pressure of about 1.4 MPa. The layered article may be exposed to a pressure of about 2 MPa. Preferably, the layered article is exposed to a pressure of about 2.5 MPa.

Step b2) may be carried out in a single pressure stage or in a two pressure stage. More pressure stages may be carried out in the claimed method. However, additional pressure stages increase the energy expenditure needed to make a composite material of the invention. In certain embodiments of the present invention it is desirable to reduce the energy input for a process of the present invention. This may be achieved by using favourable pressures or favourable temperatures. Favourable temperatures and pressures within the present context may be closer to atmospheric pressure or ambient temperature.

For example, in certain embodiments of the invention a single step of exposing the layered article to pressure is carried out at 2 MPa, optionally at a temperature of 100° C.

Step b2) may be carried out by placing the layered article in a press. The press may be a hot press.

In embodiments the process further comprises the step of heating the layered article to a temperature of up to about 120° C. Accordingly, the process of the invention may comprise the steps of:

a) providing a layered article comprising at least two layers of a first cellulose-based material and at least one interleaf layer disposed in between each of the first cellulose-based material layers;

b1) applying a solvent to the layered article;

b3) heating the layered article to a temperature of up to about 120° C.; and c) regenerating the layered article to form a composite material.

Specifically, step b2) may optionally further comprise heating the layered article at a temperature of up to 120° C. Accordingly, the process of the invention may comprise the steps of:

a) providing a layered article comprising at least two layers of a first cellulose-based material and at least one interleaf layer disposed in between each of the first cellulose-based material layers;

b1) applying a solvent to the layered article;

b2) exposing the layered article to a pressure of up to about 100 MPa and heating the layered article at a temperature of up to 120° C.; and c) regenerating the layered article to form a composite material.

The layered article may be heated at a temperature of from about 15° C. (about ambient temperature) to about 120° C. In certain embodiments the temperature may be from about 15° C. to about 100° C., from about 15° C. to about 50° C., from about 20° C. to about 50° C. or from about 35° C. to about 50° C. The temperature may be about 20° C. In embodiments the layered article is heated at a temperature of 125° C.

Step b2) may be carried out once or more than once. For example, step b2) may be carried out once or twice. If step b2) is carried out more than once it can be carried out at a different temperature and a different pressure, at the same temperature and a different pressure, at a different temperature and the same pressure or at the same temperature and pressure.

Preferably, step b2) is carried out once at 125° C. and 2 MPa.

In an aspect of the present invention there is provided a composite material obtainable by a process described herein.

The process of the present invention can be utilised to produce an article formed of the composite material of the invention. Accordingly, in an aspect of the present invention there is provided an article comprising or consisting of the composite material of the present invention.

In order to produce an article of the present invention there is provided a process for the preparation of an article, comprising the process for the preparation of the composite material and further comprising moulding the layered article or the composite material. As such, the disclosure elsewhere herein of the process for preparing a composite material applies equally to the process for preparing an article of the present invention.

In an embodiment of the present invention the process for the preparation of an article formed of the composite material comprises:

(i) providing a layered article comprising at least two layers of a first cellulose-based material and at least one interleaf layer disposed in between each of the first cellulose-based material layers;

(ii) applying a solvent to the layered article;

(iii) moulding the layered article; and (iii) regenerating the layered article to form an article.

A composite material of the present invention can be formed into an article after the composite material has been formed, optionally using water to enhance the sheet deformability of the composite material. The technique of using water to enhance the deformability of a material is called hydroforming. As shown by FIG. 8, the presence of water significantly reduces the modulus of the composite sheet, significantly increases the failure strain of the sheet and also increases the strength of the sheet. Experiments have shown that this process is reversible, and that after drying the composite material properties return to the previous, 'dried' state. Experiments have shown that the composite material normally contains ~6% water.

Accordingly, in an alternative embodiment of a process for the preparation of an article formed of the composite material, the process comprises:

(A) exposing composite material (optionally a sheet) to water and optionally heating the water; and (B) moulding the composite material to form an article.

The composite material (optionally the sheet) to be hydroformed can be left to soak in water for a period of time. The composite material may be left for up to 48 hours. For example, the material may be left for up to 24 hours or 12 hours. Preferably the composite material may be left to soak for less than 6 hours or less than 4 hours. More preferably for less than one hour, for example about 5 minutes.

In an embodiment the process is carried out at room temperature. The process may alternatively be carried out at any temperature known to the person skilled in the art, for example from 10 to 80° C. In embodiments the process may be carried out at a temperature from 15 to 60° C., from 15 to 50° C., from 15 to 40° C., or from 15 to 30° C.

In an embodiment the process further comprises the step of drying the article formed in the process. This may be done at room temperature or more preferably in a temperature controlled oven set at from about 100° C. to about 150° C., for example about 120° C.

In embodiments, the step of moulding the composite material comprises placing the sheet material in a mould, optionally wherein the mould comprises or consists of two complementary sections configured to come into contact or near contact with each other so as to form the composite material into the shaped article. Accordingly, the step of moulding comprises placing the composite material in the mould and closing two complementary sections of the mould to form the article. Closing the two complementary sections can be carried out at a closing speed of 50 to 500 mm/s, 50 to 250 mm/s, 50 to 100 mm/s, preferably 80 mm/s.

In embodiments the process is stopped when the load on the article formed of the composite material reaches 5 kN.

Articles of the present invention may be used within the automotive, sound, sports, or model industries. For example, the articles of the present invention can be made into a loudspeaker cone, automotive interiors, an insert for shin pads, fibre glass replacement, mannequin, and many more applications where a light, stiff, and strong material is needed.

The term "first cellulose-based material" may be used interchangeably with the term "cellulose-based textile" throughout. Equally, the terms "second cellulose-based material", "cellulose-based sheet material" or "interleaf layer" may be used interchangeably throughout.

BRIEF DESCRIPTION OF THE DRAWINGS

Embodiments of the invention are further described hereinafter with reference to the accompanying drawings, in which.

EXAMPLES

Comparative Example 1

A composite material not forming part of the invention was prepared following the disclosure in Huber et al (Composites: Part A, 43 (2102) 1738-1421). Huber describes a process whereby layers of a woven cellulose material are impregnated with a weight of 1-butyl-3-methylimidazolium acetate (BMIMAc) equal to the average weight of each layer and arranged in a stack. The impregnated stack is then placed into a hot press (set to 110° C.) at a pressure of 1.5 MPa for 1 hour followed by an increased pressure of 2.5 MPa for a further 20 minutes. The assembly is then removed from the hot press and washed in water for 24 hours (the coagulation/regeneration step) then further washed in boiling water for 48 hours. Finally, the assembly is dried under a pressure of 0.5 MPa for 24 hours at 75° C.

Figure 1A:
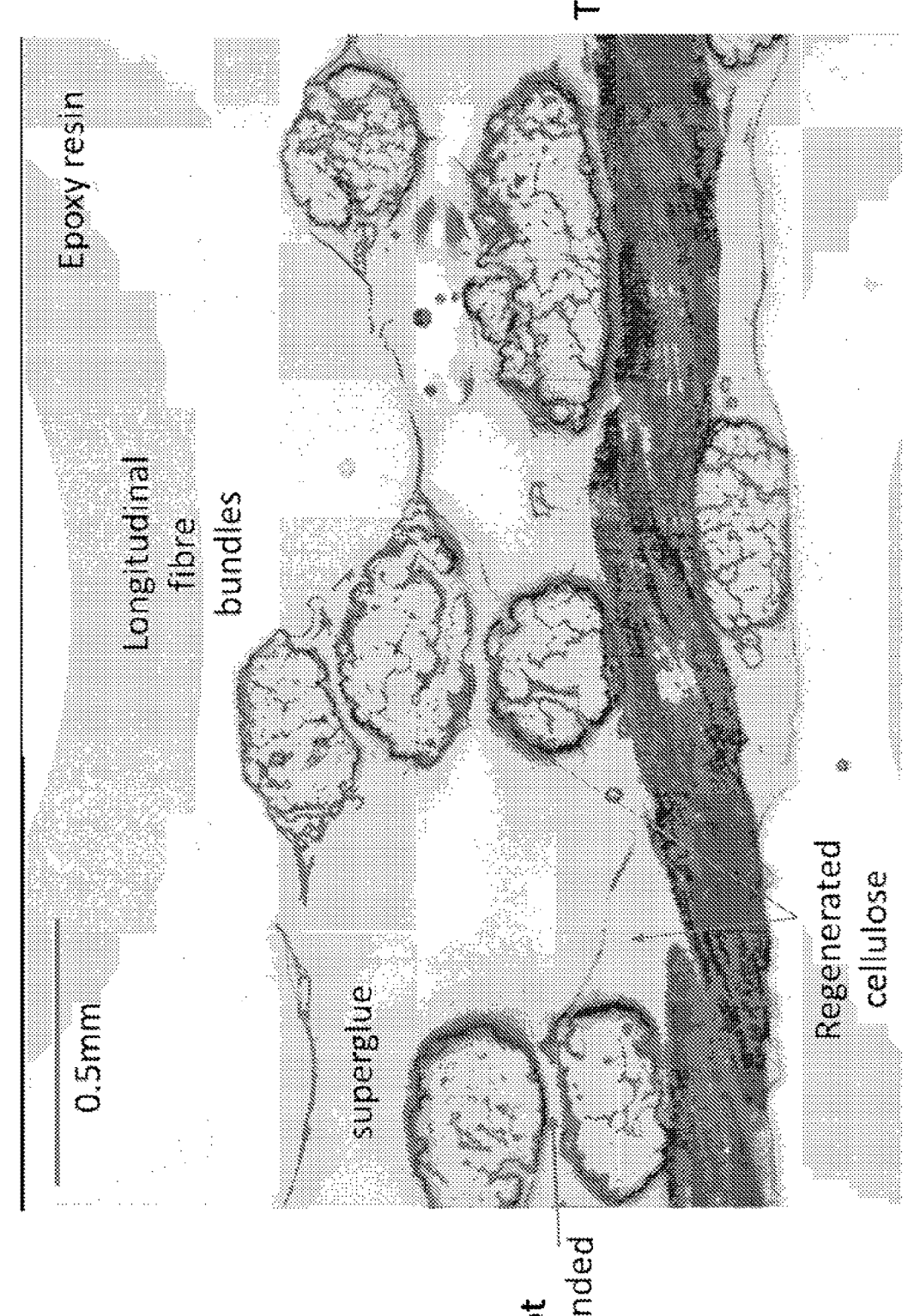
FIG. 1A shows optical micrograph images of a material analogous to that of comparative example 1 that lacks an interleaf.
Figure 1B:
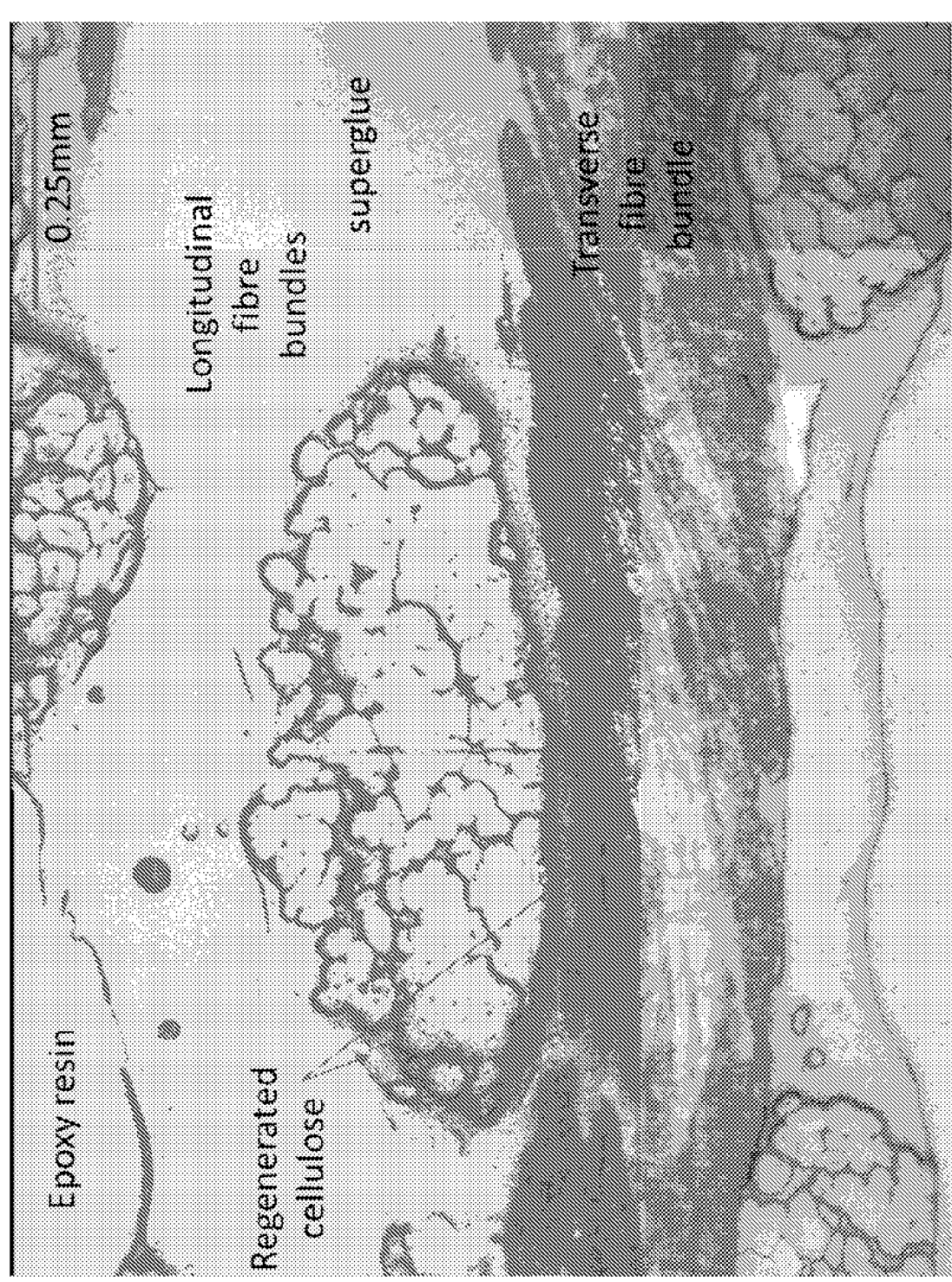
FIG. 1B shows a magnified view of the material shown in FIG. 1A.

FIG. 1A shows optical micrograph images of a material analogous to that of comparative example 1 that lacks an interleaf and FIG. 1B shows a close up version. The optical micrographs show that a thin layer of regenerated cellulose is formed around each fibre bundle due to the applied solvent, pressure and temperature. However, there is not enough to fill the gaps in the woven structure. The material that is visible in the gaps of the woven material is superglue that was used to hold the material in place during the optical micrographs.

Example 1a

A composite material of the invention was prepared by the following method. Layers of flax, a woven cellulose material, and interleaf layer are impregnated with 1-ethyl-3-methylimidazolium acetate (EMIMAc) in a ratio of weight of solvent to weight of cellulosic material of 2.5:1. The amount of solvent is reasonably equally shared across each of the layers. The flax was 2/2 twill and 100 g/m². The impregnated woven cellulose fabric was stacked with an impregnated interleaf layer of filter paper placed in between each layer of woven cellulose material. The impregnated stack was then placed into a press at ambient temperature (around 20° C.) at a pressure of 1.4 MPa for 1 hour followed by an increased pressure of 2.5 MPa for a further 20 minutes at the same temperature. The assembly was then removed from the hot press and washed in water for 20 hours (the coagulation/regeneration step) there was no further washing step. Finally, the assembly is dried under a pressure of 2.5 MPa for 1 hour at 125° C. The parameters for the Huber et al process compared to the parameters of the process of the invention are provided in Table 1 below.

TABLE 1

|  | Huber et al Process | Present Invention's Process |
|---|---|---|
| Woven cellulose material | 4 layers of flax or rayon | Flax |
| Interleaf layer | None | Filter paper |
| Solvent:cellulose ratio | 1:1 | 2.5:1 |
| Solvent | BMIMAc | EMIMAc |
| First pressure stage | 1.5 MPa for 1 hour | 1.4 MPa for 1 hour |
| Temperature for first pressure stage | 110° C. | 20° C. |
| Second pressure stage | 2.5 MPa for 20 mins | 2.5 MPa for 20 mins |
| Temperature for second stage | 110° C. | 20° C. |
| Regeneration/coagulation | 24 hours in water | 20 hours in water |
| Further washing | 48 hours, 100° C. | None |
| Drying | 48 hours, 75° C. | 1 hour, 2.5 MPa, 125° C. |

Figure 2A:
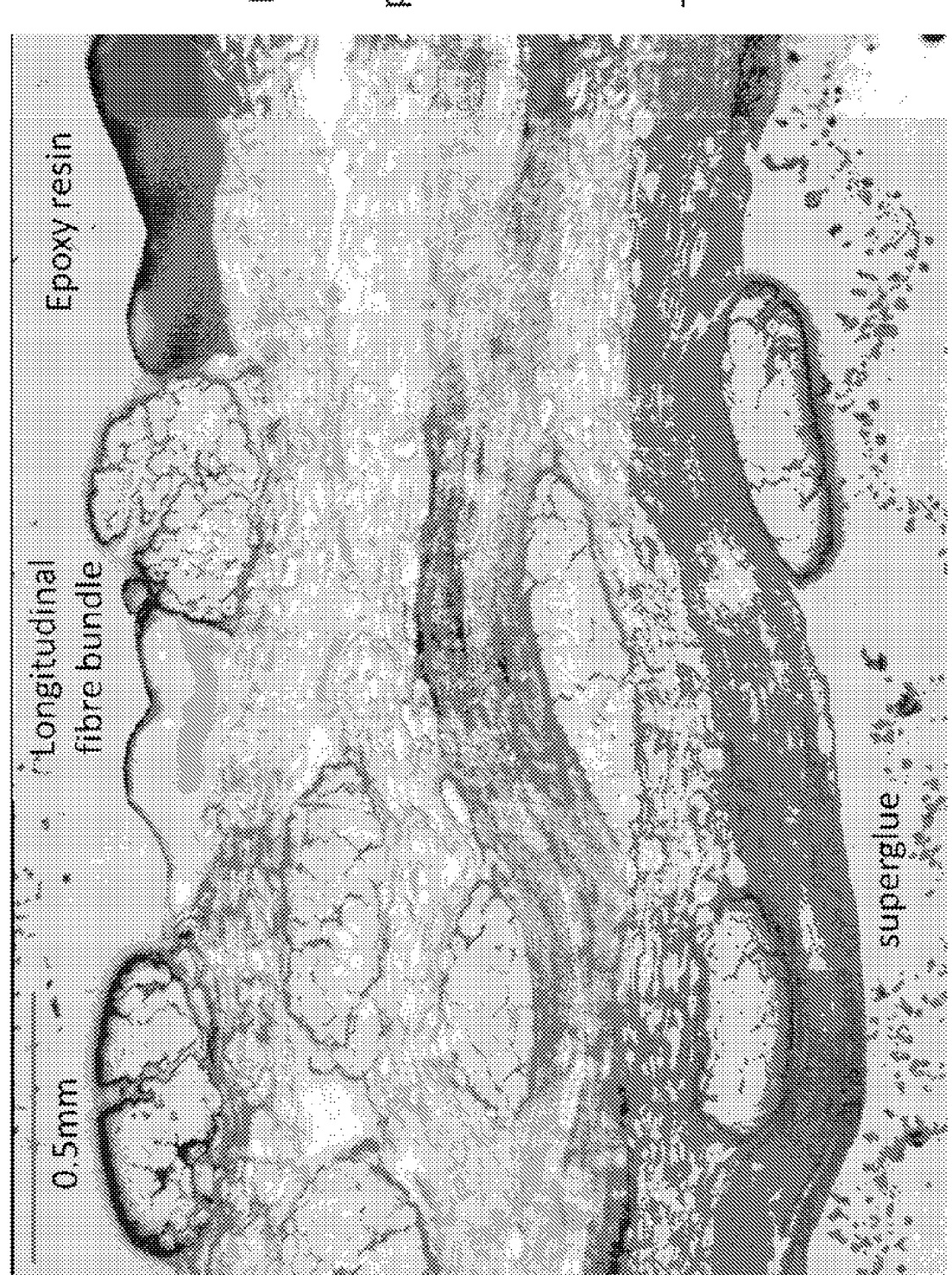
FIGS. 2A and 2B show a composite material of the present invention with a filter paper interleaf.
Figure 2B:
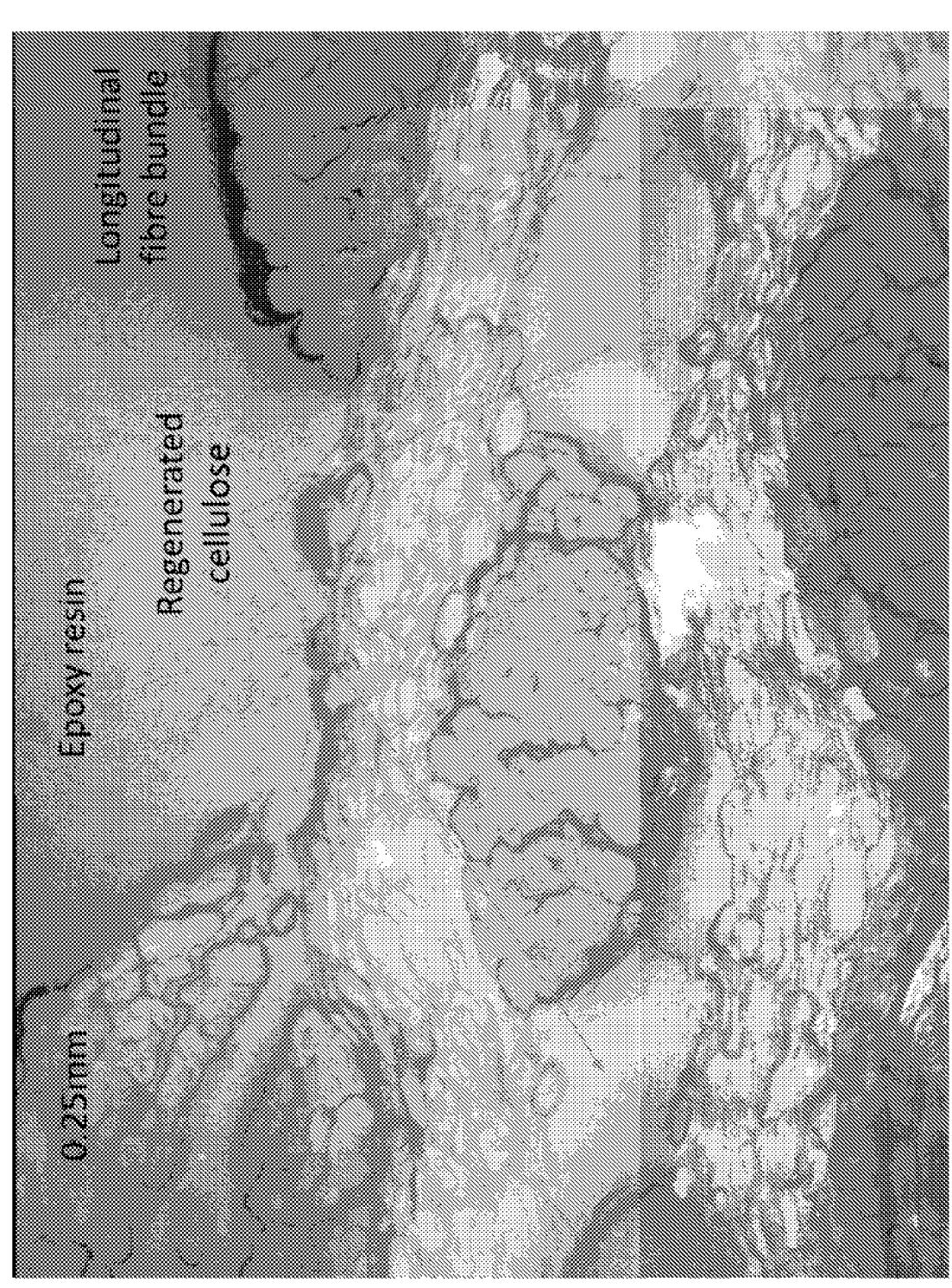

FIGS. 2 and 3 show optical micrograph images of a cross section of composite materials of the present invention. FIGS. 2A and 2B show a composite material of the present invention with a filter paper interleaf. It can be seen from the images that the filter paper interleaf layers fill in most of the gaps in the structure of the woven material and in turn regenerated cellulose fills any remaining gaps. The structure of the filter paper is still visible.

Figure 3A:
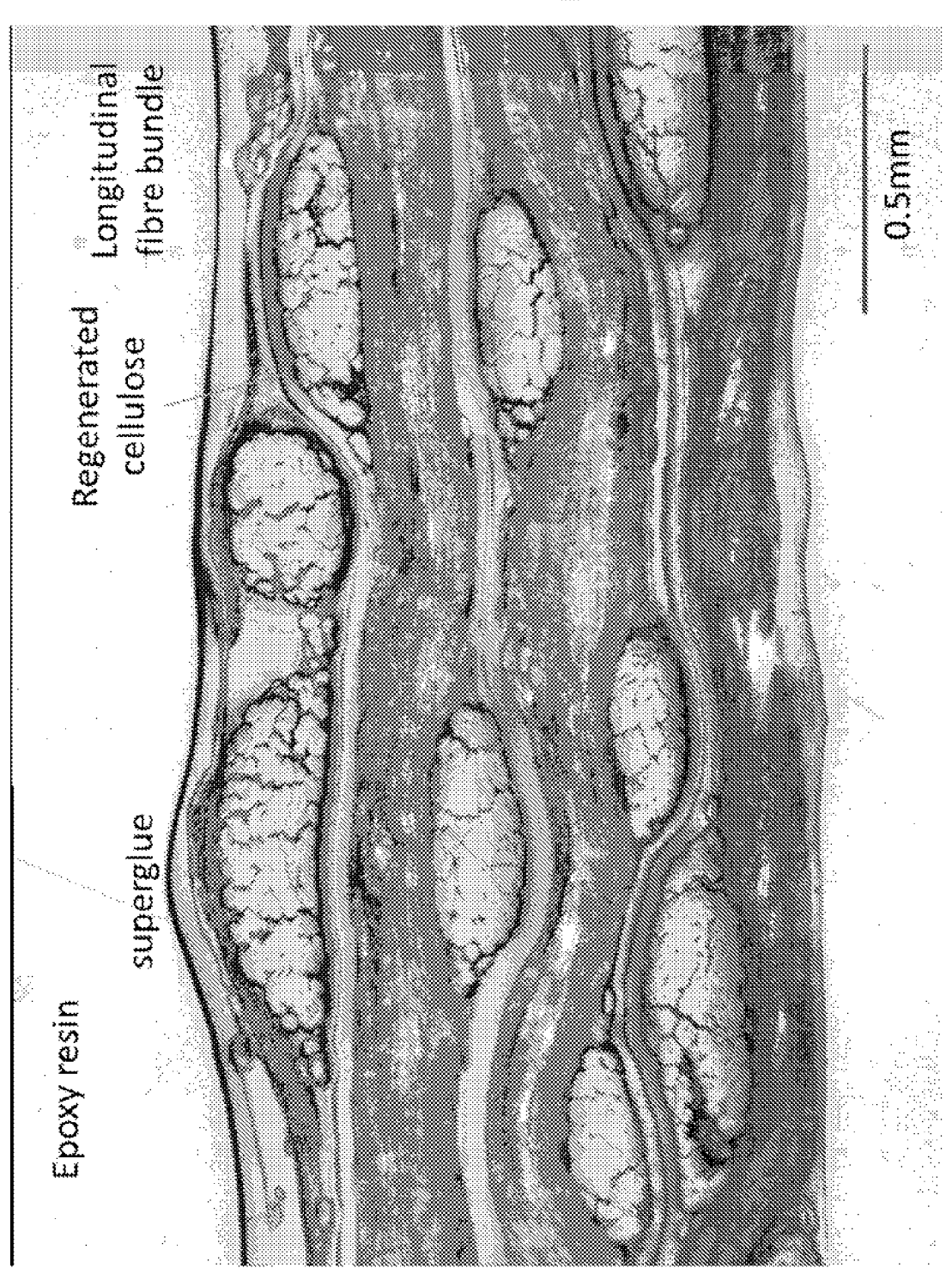
FIGS. 3A and 3B show a composite material of the present invention with an interleaf layer made up of 2 regenerated cellulose films (Natureflex).
Figure 3B:
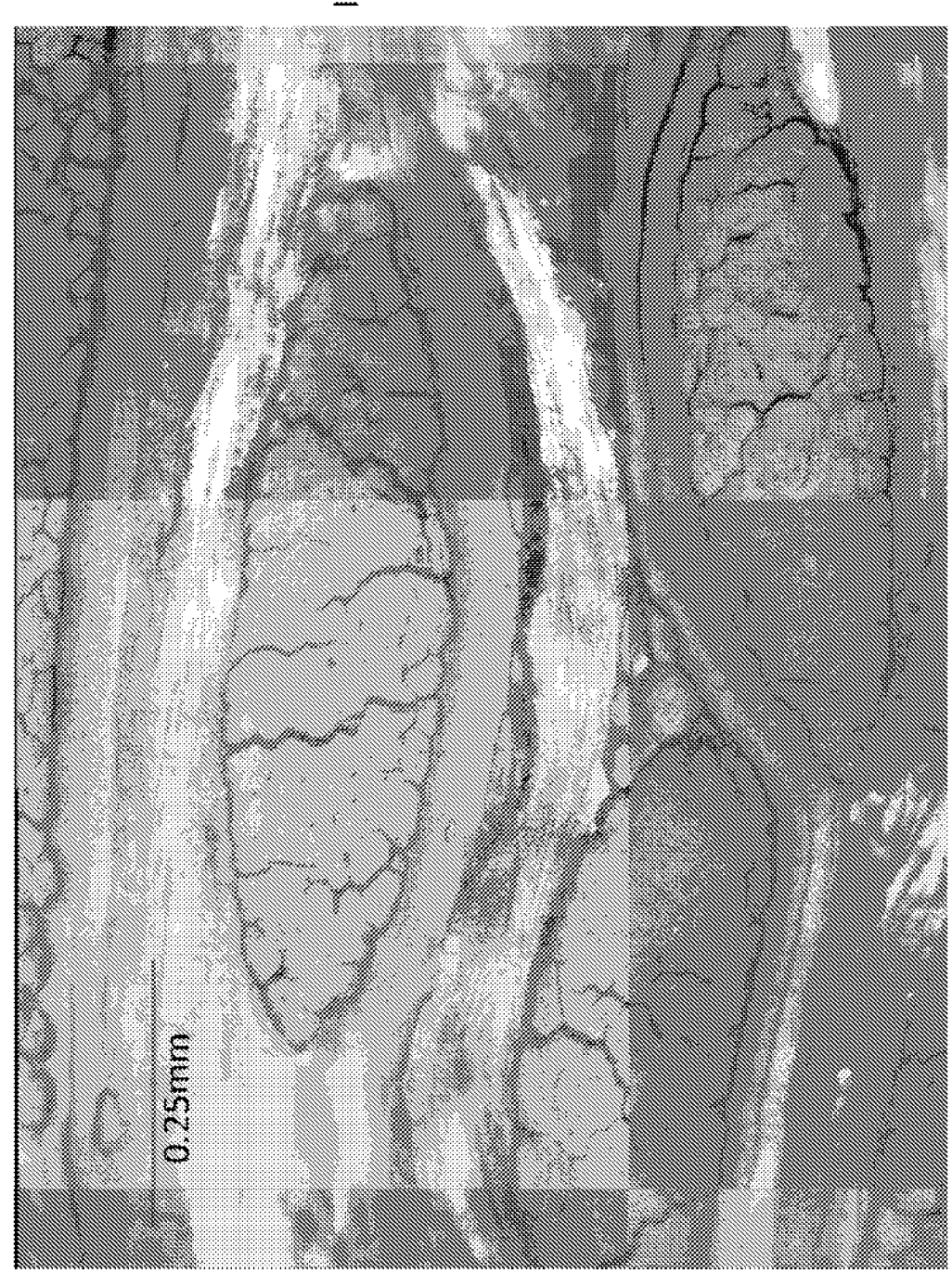

FIGS. 3A and 3B show a composite material of the present invention with an interleaf layer made up of 2 regenerated cellulose films (Natureflex). The interleaved films fill all of the gaps. The film is able to deform around the fibre bundles to bind the structure together. The individual films are still visible.

Example 1b

A composite material of the invention was prepared by forming an impregnated stack as described in Example 1a except the interleaf was cellophane. The impregnated stack was then placed into a press at ambient temperature (around 100° C.) at a pressure of 2 MPa for 2 hours. The assembly was then removed from the hot press and washed in water for 20 hours (the coagulation/regeneration step) there was no further washing step. Finally, the assembly is dried under a pressure of 2 MPa for 1 hour at 125° C. This process removes one of the pressure stages of Example 1a and increases the temperature and length of the pressure step.

Example 2

Figure 4:
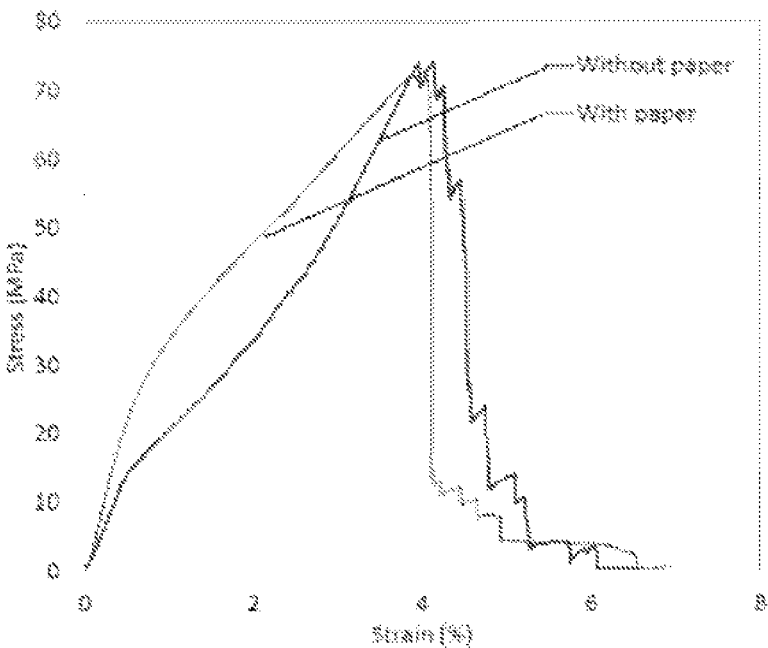
FIG. 4 shows a stress strain graph for the composite material of the invention and the comparative example without interleaf.

A comparison of the in-plane tensile properties of the composite materials of the invention was carried out. A composite material with a filter paper interleaf was prepared according to the process set out in Example 1a and a composite material using cellophane as the interleaf material was prepared as set out in Example 1b. A comparative material was also prepared without an interleaved layer but with the same procedure as Example 1a. It was demonstrated that the Young's modulus was significantly improved for Example 1a and 1b, while the tensile strength and failure strain remain unaffected. The properties of the materials prepared according to Example 1a and Example 1b demonstrated improved properties over the comparative example without the interleaf and the composite material described in Huber et al. The data is shown in Table 2 below for the composite material of Example 1a, Example 1b and the comparative example. The stress strain graph for the composite material of Example 1a, and the comparative example without interleaf is shown in FIG. 4

TABLE 2

|  | Composite Material of Example 1a | Comparative Example without Interleaf | Composite Material of Example 1b | Results reported by Huber et al |
|---|---|---|---|---|
| Young's Modulus (GPa) | 5.4 | 2.8 | 7.1 | 0.9 |
| Tensile Strength (MPa) | 75 | 75 | 120 | 45 |

Example 3

A further experiment was carried out to compare the interlayer strength of the composite material of the present invention against a comparative example without an interleaf. This was conducted using a T peel test following the guidelines of ASTM D1876. The sample width was 10 mm, the length was 80 mm and the testing speed was 80 mm/min. The measured peel force was averaged between 20 mm and 70 mm on the sample, and the results are presented in terms of the average force for a 1 metre width (N/m). As can be seen from Table 3 below the peel strength was considerably higher for the composite material of the present invention.

TABLE 2

|  | Composite Material of the Invention | Comparative Example without Interleaf |
|---|---|---|
| Peel Strength (N/m) | 400 | 40 |

Figure 5:
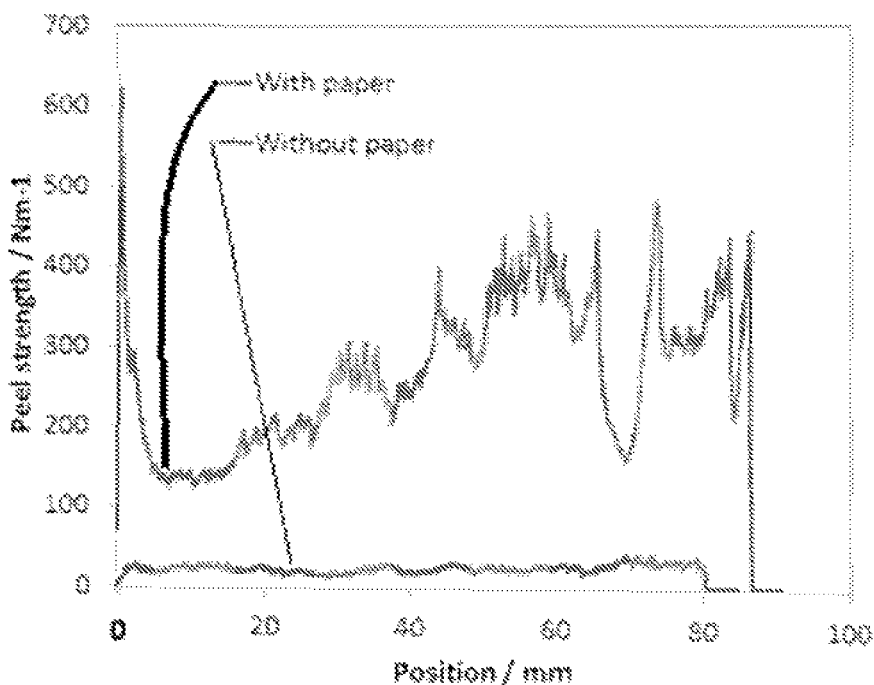
FIG. 5 shows a graph of peel strength against position defined as the distance from the edge of a piece of composite material.

FIG. 5 shows a graph of peel strength against position defined as the distance from the edge of a piece of composite material. As is evident from FIG. 5 at all positions the composite of the material has a much higher peel strength.

It is clear from this data that the presence of an interleaf of a sheet-based cellulose material has a surprising beneficial effect of the peel strength of materials derived from cellulose based woven materials.

Example 4

Figure 6:
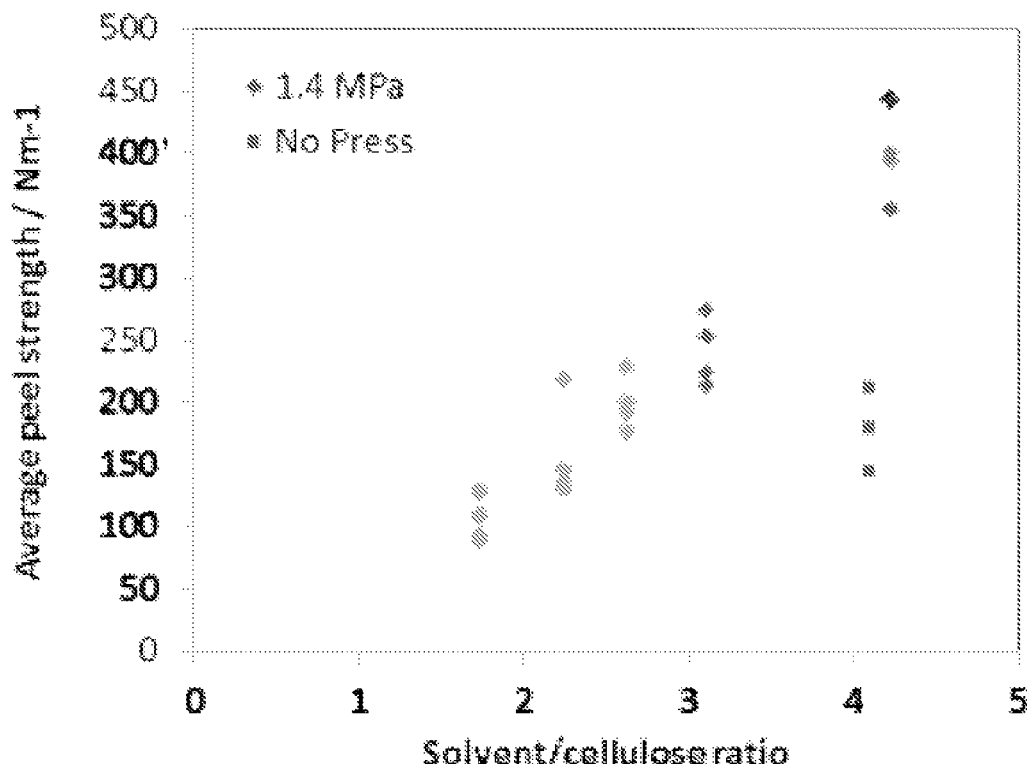
FIG. 6 shows a graph of the average peel strength for a composite material made using the indicated ratio of solvent to the amount of cellulosic material.

The amount of solvent used in the process also has a surprising effect on the properties of the composite material of the present invention. A composite material was prepared according to Example 1; however, the solvent to cellulose material ratio was modified. Solvent to cellulose ratios of 1.73:1, 2.25:1, 2.63:1, 3.11:1 and 4.23:1 were tested with a pressure of 1.4 MPa applied to the stack of layers impregnated with the relevant amount of solvent. FIG. 6 shows that an increasing amount of solvent relative to the amount of cellulose material led to an increase in average peel strength.

However, at higher levels of solvent at around a 4:1 ratio of solvent to cellulose, a high amount of flashing was observed at the edges of the press as pressure and heat was being applied. Flashing is excess cellulose that is squeezed out of the press and therefore out of the composite material. Therefore, there is a preference to avoid ratios above 4.5:1.

Example 5

The type of textile also plays a role on the properties of the composite material. A composite material according to Example 1 was obtained with flax and Lyocell (a man-made cellulose-based fabric) as the woven cellulose material. The beneficial properties of composite materials of the invention were achieved. However, the flax based composite material performed significantly better than the Lyocell fabric. The results are shown in Table 3 below.

TABLE 3

|  | Tensile Modulus (GPa) | Tensile Strength (MPa) | Peel Strength (N/m) |
|---|---|---|---|
| Flax woven material | 4.4 | 86 | 200-400 |
| Lyocell woven material | 4.4 | 52 | 100 |

Example 6

Figure 7:
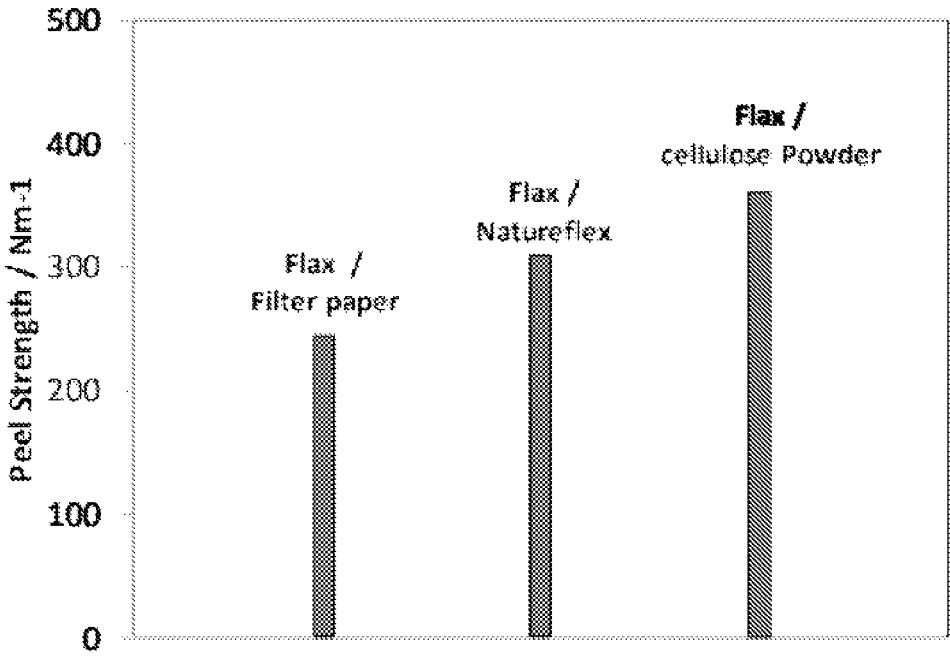
FIG. 7 is a graph showing peel strength for a composite material made with different interleaf layers.

As well as the type of textile playing a role on the peel strength. The material used as the interleaf layer also plays a role. A Flax composite material according to Example 1 was prepared with filter paper, Natureflex and cellulose powder as the interleaf. The results of peel tests with the different interleaf layers can be seen in FIG. 7.

Example 7

Wide angle X-ray measurements (WAXS) for a range of materials have been carried out. The WAXS measurements were carried out using a Huber goniometer employing Copper $K_\alpha$ radiation using an accelerating Voltage of 40 kV and a current of 30 mA. 2θ scans were carried out between values of 5 and 30° C. at angle increments of 0.2° and a counting time of 120 s at each position. A background scan was carried out using the same conditions, but without the sample in position, to subtract any x-rays entering the detector by the air scattering, etc. After data collection, the resulting 2θ scans are examined to assess what characteristic peaks are present (cellulose I, cellulose II and the amorphous phase) and then the data is fitted with these combinations of peaks (using Excel solver) to establish what phases are present and in what fraction. The materials that were tested are as follows:

(1) Pure linen cloth (2) Flax cloth with no interleaf (3) Flax cloth with a filter paper interleaf (4) Flax cloth with a regenerated cellulose interleaf (Natureflex 23 NP film)

The X-ray measurements allow for the determination of the amount of different forms of cellulose. The percentage amounts of the different types of cellulose are indicated in Table 4 below.

TABLE 4

| Material | Cellulose 1 (%) | Amorphous cellulose (%) | Regenerated cellulose (%) | Matrix Fraction | Peel Strength (N/m) |
|---|---|---|---|---|---|
| (1) | 78 | 22 | 0 | NA | NA |
| (2) | 64 | 30 | 6 | 14 | 40 |
| (3) | 58 | 34 | 8 | 26 | 250 |
| (4) | 48 | 34 | 18 | 34 | 330 |

It is clear from Table 4 that incorporation of either a filter paper interleaf or a regenerated cellulose film interleaf gives an order of magnitude increase in the interlayer peel strength with only a 23% dilution of the original flax fibre content (86% fibres using no film and 66% with the Nature flex 23NP film). Accordingly, as shown in the Figures, the material properties of the flax fibre are maintained.

Example 8

A sheet of composite material of the present invention was formed into a shaped article by a hydroforming process. The apparatus utilised in the hydroforming process is based around that proposed by Hou in 1997 (Hou, M., Composites Part A28A (1997) 695-702q1997 Elsevier Science Limited) and consists of a matched hemispherical mould (or another desired shape) and a hold down (or gripper) plate. The gripper plate stops the composite material sheet from wrinkling as it is being deformed.

The composite material sheet to be hydroformed can be left to soak in water overnight or more preferably for 5 minutes before forming. It is then placed between the matched moulds ready for forming. The forming can be carried out at room temperature (and then the formed sheet is subsequently dried) or more preferably in a temperature controlled oven set at 120° C., where the sheet is both formed and dried in the same process. Forming is carried out at a closing speed of 80 mm/s and the forming process is stopped when the load reaches 5 kN. The mould is then opened and the formed sample is removed.

Figure 8:
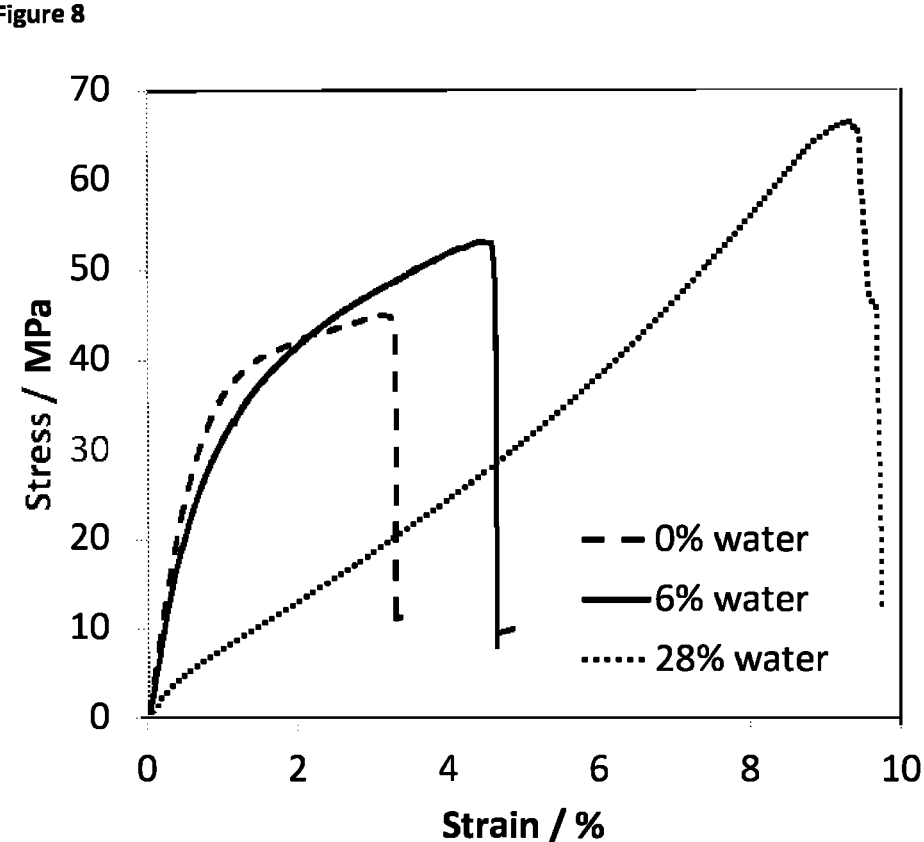
FIG. 8 shows the tensile properties for a composite material of the present invention with three levels of adsorbed water. 0%, 6% and 28%

To aid understanding of the hydroforming process, tensile tests were carried out (under ASTM testing standard D638) at various levels of water absorption. Parallel strips were cut from a flat ACC sheet, and tested at room temperature after being conditioned at various water contents. FIG. 8 shows typical tensile stress-strain curves for three conditions. A dry ACC sheet, an ACC sheet with 6% adsorbed water (which is the normal equilibrium water uptake at standard room conditions of 20° C. and 50% RH) and a sample with 28% water.

The result show that while there is little effect on tensile properties of the ACC sheet at 6% content water, there is a significant difference for 28% water content. At this highest water content, the stiffness (as specified by the initial gradient of the stress-strain curve) is six times lower than for the other water contents. Also, the maximum strain before failure increases by 100% with 28% water content.

It is considered that during forming the sheet is subjected mainly to tensile stresses. Consequently, the high water content reduces the resistance to deformation (as determined by the modulus) by six times and also increases the amount the sheet can stretch before breaking (as measured by the failure strain) by a factor of 2. It is clear that these two features significantly improve the formability of the ACC sheet.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. An all-cellulose composite material, comprising a first cellulose-based material and a second cellulose-based material, wherein the first cellulose-based material and the second cellulose-based material are alternately layered with one another such that there are at least two layers of either the first or second cellulose-based material and at least one layer of the other cellulose-based material;

wherein the first cellulose-based material is a textile;

wherein the second cellulose-based material is a sheet of filter paper or a cellophane film;

wherein the all-cellulose composite material further comprises an alloy region, wherein the alloy region is a region comprising material of both the first cellulose-based material and the second cellulose-based material; and wherein the cellulose comprises:

from about 10% to about 90% cellulose type 1;

from about 10% to about 50% amorphous cellulose; and from about 2% to about 45% regenerated cellulose and/or cellulose II.

2. The all-cellulose composite material of claim 1, wherein the all-cellulose composite material has from 3 to 100 layers in total of the first cellulose-based material and the second cellulose-based material.

3. The all-cellulose composite material of claim 1, wherein the cellulose comprises:

from about 40% to about 60% cellulose type 1;

from about 25% to about 38% amorphous cellulose; and from about 2% to about 45% regenerated cellulose and/or cellulose II.

4. The all-cellulose composite material of claim 1, wherein the all-cellulose composite material has a peel strength of at least 50 N/m.

5. The all-cellulose composite material of claim 1, wherein the first cellulose-based material is selected from: cotton, flax, jute, hemp, ramie, sisal, bamboo, rayon, Tencel, Ioncell, and lyocell.

6. The all-cellulose composite material of claim 1, wherein the second cellulose-based material is a cellophane film.

* * * * *